Aug. 28, 1923.
N. B. HURD
BALL BEARING HINGE
Filed May 15, 1923
1,466,228
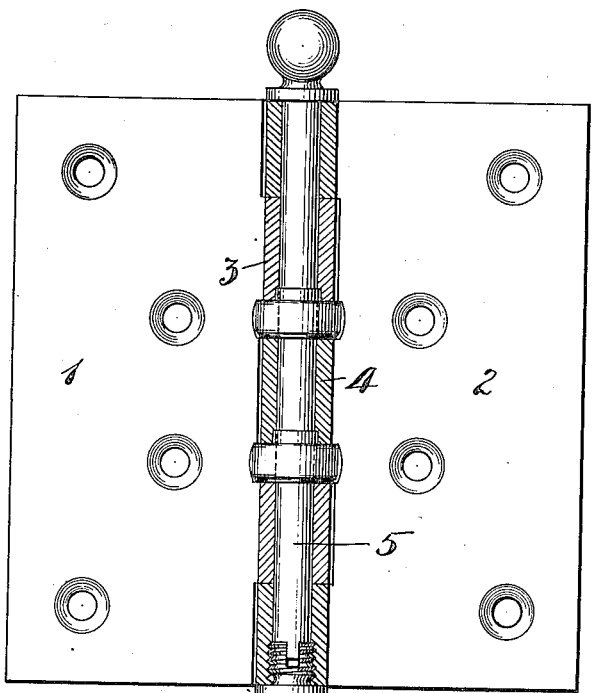
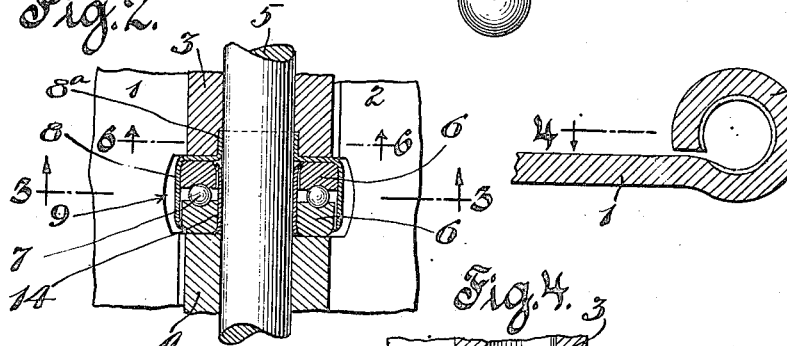
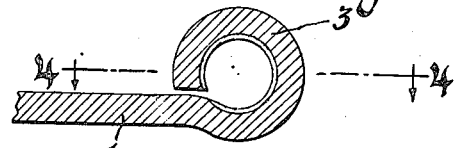
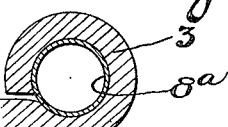
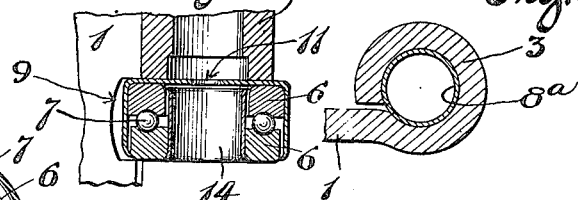
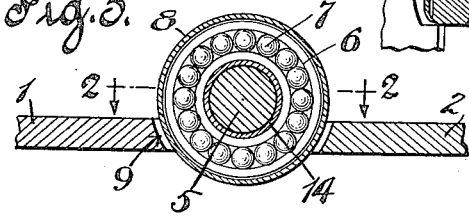
INVENTOR
Norman B. Hurd
BY
Nicholson Brothers
ATTORNEYS.

Patented Aug. 28, 1923.

1,466,228

UNITED STATES PATENT OFFICE.

NORMAN B. HURD, OF NEW BRITAIN, CONNECTICUT, ASSIGNOR TO AMERICAN HARDWARE CORPORATION, OF NEW BRITAIN, CONNECTICUT, A CORPORATION OF CONNECTICUT.

BALL-BEARING HINGE.

Application filed May 15, 1923. Serial No. 639,142.

*To all whom it may concern:*

Be it known that I, NORMAN B. HURD, a citizen of the United States of America, residing at New Britain, Connecticut, have invented new and useful Improvements in Ball-Bearing Hinges, of which the following is a specification.

My invention relates to hinges, and includes features which involve both structural improvement as well as improvement in method of manufacture.

The object of the invention is to provide a very simple and effective ball bearing hinge and method of assembly especially useful in hinges of the so-called "butt" type.

In the accompanying drawings—

Figure 1 is a front elevation of a hinge embodying my invention, the knuckles being shown in section.

Fig. 2 is a relatively enlarged detail view of one of the ball bearing features and the parts directly associated therewith, said view being shown partly in section on the plane of the line 2—2 of Fig. 3.

Fig. 3 is a section on the plane of the line 3—3 of Fig. 2.

Fig. 4 is a section on the plane of the line 4—4 of Fig. 5.

Fig. 5 is a cross section through a portion of one leaf and one of its knuckles.

Fig. 6 is a section on the plane of the line 6—6 of Fig. 2.

Fig. 7 is a side elevation of a portion of one of the tools used in my new method of assembling the bearing with the hinge.

1—2 represent the two leaves of a butt hinge, the same being provided, respectively, with interengaging knuckles 3—4. 5 is the usual pintle. In the drawings I have shown two ball bearings, but a description of one will suffice for both. Each ball bearing comprises two steel washers 6—6, the faces of which are grooved to form complementary ball races. 8 is a relatively thin sheet metal housing which surrounds the edges of the two washers 6—6, to hold the same against separation but yet so as to permit said washers to turn freely on said balls and relatively to each other. $8^a$ is an integral sleeve-like extension from one end of said housing, which sleeve projects into a counterbore in one end of one of the knuckles, as shown in Fig. 2. The edge of the hinge leaf adjacent to the said ball bearing is provided with a notch or recess 9, into which the edge of the ball bearing slightly extends. From an inspection of Fig. 2 it is apparent that when the bearing is in place, as shown, the said leaves may be taken apart and yet the ball bearing will be retained in place since the extension $8^a$ will hold the bearing from lateral displacement relatively to the knuckle, and the shoulder at the edge of the recess 9 will hold the bearing from longitudinal displacement. If desired, an internal sleeve 14 may be provided at the inside of said washers 6—6, to exclude dirt or grit from the ball raceways. This sleeve 14 is not essential in all cases.

The method of manufacture and assembly is as follows:

The housing referred to is first made cup shaped, as shown in Fig. 4, and the center of the cup is preferably provided with a small opening, indicated at 11. 12 is an assembling punch, which is preferably pointed at one end, said punch being preferably of the same size as the pintle 5. To assemble the bearing with a hinge leaf the bearing is placed in the position shown in Fig. 4 on the end of one knuckle, and the punch is then driven through. The point of the punch first enters the central opening 11, and as it is forced in it displaces the metal around opening 11 and forces it into the counterbored portion of the knuckle 3 in the form of an integral tubular extension $8^a$, as shown in Fig. 2. This method of construction materially reduces the number of steps heretofore necessary to first make and assemble the individual bearings and thereafter assemble said bearings with the hinge knuckles.

It will be noted that the method of assembling the ball bearing with one of the hinge leaves simultaneously forms a pintle passage through the housing. Heretofore, in unit handling bearings of this type, sleeve-like devices have been provided to hold the ball raceway plates in assembled relation to form what is termed a unit handling bearing, such devices being very old in this art. In no case, however, has the housing been formed as a cup-shaped device, which requires merely the spinning over of one edge to hold the raceway plates assembled, the other end being provided with integral extension for the purpose of connecting the bearing with the hinge knuckle.

By this construction and method I am en-

What I claim is:

1. A hinge comprising a pair of leaves with inter-engaging knuckles, a pintle, a ball bearing comprising two washer-like plates having ball races therein with balls in said races, a sheet-metal housing surrounding said bearing washers to loosely hold the same in operative relation, and an outwardly extending integral sleeve-like extension on the outer side of said housing, said extension entering one of said knuckles to hold said bearing in proper alignment with the bore thereof.

2. A hinge comprising a pair of leaves with inter-engaging knuckles, a pintle, a ball bearing comprising two washer-like plates having ball races therein with balls in said races, a sheet metal housing surrounding said bearing washers to loosely hold the same in operative relation, and an outwardly extending integral sleeve-like extension on the outer side of said housing, said extension entering one of said knuckles to hold said bearing in proper alignment with the bore thereof, the edge of the leaf adjacent said knuckle being recessed, one side of said housing projecting into said recess, the shoulder at one end of said recess holding said bearing against accidental longitudinal separation from said knuckle.

3. In a ball bearing hinge construction, the method of assembling a ball bearing and hinge leaf comprising, placing said bearing adjacent to one end of one of the knuckles on said leaf and then forcing a portion of said bearing into the bore of the knuckle to simultaneously form an integral bearing aligning sleeve as well as a pintle passage through said bearing.

NORMAN B. HURD.